US012723430B2

(12) United States Patent
Lee

(10) Patent No.: US 12,723,430 B2
(45) Date of Patent: Sep. 1, 2026

(54) ADJUSTABLE DOOR HANDLE MOUNTING STRUCTURE AND DOOR LOCK HANDLE

(71) Applicant: TAIWAN FU HSING INDUSTRIAL CO., LTD., Kaohsiung City (TW)

(72) Inventor: Ching-Wan Lee, Kaohsiung City (TW)

(73) Assignee: TAIWAN FU HSING INDUSTRIAL CO., LTD., Kaohsiung City (TW)

( * ) Notice: Subject to any disclaimer, the term of this patent is extended or adjusted under 35 U.S.C. 154(b) by 30 days.

(21) Appl. No.: 19/014,235

(22) Filed: Jan. 9, 2025

(65) Prior Publication Data

US 2026/0146472 A1 May 28, 2026

(30) Foreign Application Priority Data

Nov. 28, 2024 (TW) ................................ 113213006

(51) Int. Cl.
*E05B 1/00* (2006.01)

(52) U.S. Cl.
CPC ................................ *E05B 1/0015* (2013.01)

(58) Field of Classification Search
CPC . Y10T 292/57; Y10T 292/82; Y10T 70/5761; Y10T 70/5832; Y10T 292/85; Y10T 292/865; E05B 3/003; E05B 2003/006; E05B 3/02; E05B 3/04; E05B 3/06; E05B 3/08; E05B 3/10; E05B 1/0053; E05B 65/0829; E05B 79/06; E05B 1/0015
USPC ...................................................... 292/336.3
See application file for complete search history.

(56) References Cited

U.S. PATENT DOCUMENTS 3,107,113 A * 10/1963 Sconzo ................... E05B 15/02 292/DIG. 60
4,432,576 A * 2/1984 Wartian .................... E05B 9/08 292/DIG. 60
4,732,418 A * 3/1988 Crown .................. E05B 13/004 70/216
4,883,296 A * 11/1989 Laurie ..................... E05B 9/082 292/DIG. 64
4,905,444 A * 3/1990 Semaan .................... E04B 2/94 52/235
5,026,013 A * 6/1991 Robbins .................. F16B 9/052 D8/352
5,071,099 A * 12/1991 Kuo ....................... A47K 10/10 248/224.7

(Continued)

*Primary Examiner* — Christine M Mills
*Assistant Examiner* — Faria F Ahmad
(74) *Attorney, Agent, or Firm* — Winston Hsu

(57) ABSTRACT

An adjustable door handle mounting structure includes a handle mount portion, a fixed plate, and a movable mounting post. The handle mount portion has a plurality of ribs. The fixed plate has a guiding slot and is fixed to the handle mount portion facing the ribs. The ribs and the guiding slot extend in parallel. The movable mounting post includes a movable plate and a post body with an engagement structure fixed on the movable plate. The movable plate is movably disposed between the ribs and the fixed plate. The post body passes through the guiding slot. The guiding slot guides the movement of the post body. A door lock handle includes a grip portion and two mount portions located at two ends of the grip portion. One of the mount portions is provided with a door lock actuator; the other includes the above adjustable door handle mounting structure.

17 Claims, 4 Drawing Sheets

(56) References Cited

U.S. PATENT DOCUMENTS

| | | | | | |
|---|---|---|---|---|---|
| 5,377,450 | A * | 1/1995 | Varajon | E05B 85/12 | 296/146.7 |
| 5,762,387 | A * | 6/1998 | Edgerly | E05B 15/02 | 292/DIG. 60 |
| 6,113,045 | A * | 9/2000 | Kuo | A47K 10/10 | 248/224.7 |
| 6,357,808 | B1 * | 3/2002 | Supernat | E05B 9/082 | 16/415 |
| 6,401,302 | B1 * | 6/2002 | Josserand | E05B 79/06 | 292/336.3 |
| 6,520,463 | B1 * | 2/2003 | Ouano | A47B 96/061 | 248/223.41 |
| 6,523,871 | B1 * | 2/2003 | Josserand | E05B 79/06 | 292/DIG. 41 |
| 7,082,794 | B2 * | 8/2006 | Shen | E05B 17/0062 | 292/169.22 |
| 7,111,336 | B1 * | 9/2006 | Lai | A47K 10/04 | D6/524 |
| 7,281,301 | B2 * | 10/2007 | Huang | E05B 1/0015 | 16/412 |
| 7,364,212 | B1 * | 4/2008 | Fan | E05B 1/003 | 292/336.3 |
| 7,588,272 | B2 * | 9/2009 | Gephart | E05B 3/00 | 292/342 |
| 7,926,772 | B2 * | 4/2011 | Lowe | A47K 10/10 | 248/220.21 |
| 8,459,920 | B2 * | 6/2013 | Selle | F16B 5/0628 | 411/509 |
| 8,646,626 | B2 * | 2/2014 | Hsu | A47K 10/10 | 248/222.13 |
| 8,733,204 | B2 * | 5/2014 | Voss | A47J 37/0786 | 74/553 |
| 9,709,318 | B2 * | 7/2017 | Wing | E05B 1/0015 | |
| 9,909,338 | B1 * | 3/2018 | Abrahams | E05B 1/0015 | |
| 10,161,162 | B2 * | 12/2018 | Schaeffer | E05B 9/08 | |
| 10,415,279 | B2 * | 9/2019 | Flannery | E06B 3/52 | |
| 10,526,824 | B2 * | 1/2020 | Farias | E05C 19/00 | |
| 10,920,451 | B2 * | 2/2021 | Park | E05B 9/082 | |
| 10,967,939 | B1 * | 4/2021 | Cifers, III | B60R 11/00 | |
| 11,105,118 | B2 * | 8/2021 | Morse | E05B 85/12 | |
| 11,143,360 | B2 * | 10/2021 | Brownstone | F16B 21/065 | |
| 11,359,416 | B2 * | 6/2022 | Heyduck | E05B 79/06 | |
| 11,549,290 | B2 * | 1/2023 | Hsu | E05B 13/105 | |
| 11,846,122 | B2 * | 12/2023 | Johansson | E05B 7/00 | |
| 11,859,405 | B2 * | 1/2024 | Hagiwara | E05B 3/00 | |
| 11,913,599 | B1 * | 2/2024 | Schoenfeld | F16M 13/02 | |
| 11,946,292 | B2 * | 4/2024 | Yanaka | B60J 5/0468 | |
| 12,559,992 | B2 * | 2/2026 | Häger | E05B 79/06 | |
| 2005/0156439 | A1 * | 7/2005 | Furlong | E05B 9/08 | 292/336.3 |
| 2006/0200948 | A1 * | 9/2006 | Steurer | F25D 23/028 | 16/412 |
| 2011/0266404 | A1 * | 11/2011 | Hsu | A47K 10/18 | 248/220.21 |
| 2016/0010368 | A1 * | 1/2016 | Tanoguchi | B60J 5/0493 | 16/412 |
| 2022/0170292 | A1 * | 6/2022 | Dulmes | E05B 1/0015 | |
| 2023/0287713 | A1 * | 9/2023 | Mitchell | E05B 83/40 | |
| 2024/0076913 | A1 * | 3/2024 | Akanou | E05B 81/77 | |

* cited by examiner

ADJUSTABLE DOOR HANDLE MOUNTING STRUCTURE AND DOOR LOCK HANDLE

BACKGROUND OF THE INVENTION

1. Field of the Invention

The present invention relates to a mounting structure for door handle and a door lock handle.

2. Description of the Prior Art

Generally, a door handle is fixed onto the door panel through mount portions located at both ends of the door handle. These two mount portions are usually screwed to the door panel through fixed screw positions; in other words, the relative positional relationship of the mounting holes on the door panel must be almost the same as the screw positions of the door handle in order to install the door handle correctly. However, in actual implementation, the mounting holes on the door panel and mounting posts of the door handle do not always match exactly. For example, if the distance between the upper and lower mounting holes is too large or too small (e.g., exceeding the allowed mounting tolerance), the door handle cannot be installed.

SUMMARY OF THE INVENTION

In view of the problems in the prior art, an objective of the invention is to provide an adjustable door handle mounting structure, which uses an adjustable structure so that the position of its mounting post can be adjusted to match an actual mounting hole position of a door panel.

An adjustable door handle mounting structure of an embodiment according to the invention includes a handle mount portion, a fixed plate, and a movable mounting post. The handle mount portion has a plurality of ribs. The fixed plate has a guiding slot. The fixed plate is fixed to the handle mount portion facing the plurality of ribs. The plurality of ribs and the guiding slot extend in parallel. The movable mounting post includes a movable plate and a post body fixed on the movable plate. The post body has an engagement structure. The movable plate is movably disposed between the plurality of ribs and the fixed plate along an extending path of the guiding slot. The post body passes through the guiding slot. The guiding slot limits the post body to move along the extending path of the guiding slot. Thereby, the position of the movable mounting post relative to the handle mount portion can be adjusted to adapt to the actual mounting hole position on the door panel. Therefore, the adjustable door handle mounting structure according to the invention can increase the installation tolerance of the door handle, which facilitates installation.

Another objective of the invention is to provide a door lock handle, which includes the above adjustable door handle mounting structure, so that the position of the movable mounting post can be adjusted to adapt to the actual mounting hole position on the door panel.

A door lock handle of an embodiment according to the invention includes a grip portion, a first mount portion, and a second mount portion. The first mount portion and a first end of the grip portion are fixedly connected. The first mount portion has a door lock actuator. The door lock actuator is exposed. The second mount portion and a second end of the grip portion are fixedly connected. The second mount portion includes an adjustable door handle mounting structure. The adjustable door handle mounting structure includes a handle mount portion, a fixed plate, and a movable mounting post. The handle mount portion is fixedly connected to the second end and has a plurality of ribs. The fixed plate has a guiding slot. The fixed plate is fixed to the handle mount portion facing the plurality of ribs. The plurality of ribs and the guiding slot extend in parallel. The movable mounting post includes a movable plate and a post body fixed on the movable plate. The post body has an engagement structure. The movable plate is movably disposed between the plurality of ribs and the fixed plate along an extending path of the guiding slot. The post body passes through the guiding slot. The guiding slot limits the post body to move along the extending path of the guiding slot. Similarly, the position of the movable mounting post of the adjustable door handle mounting structure relative to the handle mount portion can be adjusted to adapt to the actual mounting hole position on the door panel. Therefore, the door lock handle according to the invention can increase the installation tolerance of the door handle through the adjustable door handle mounting structure, which facilitates installation.

These and other objectives of the present invention will no doubt become obvious to those of ordinary skill in the art after reading the following detailed description of the preferred embodiment that is illustrated in the various FIGURES and drawings.

DETAILED DESCRIPTION

Figure 1:
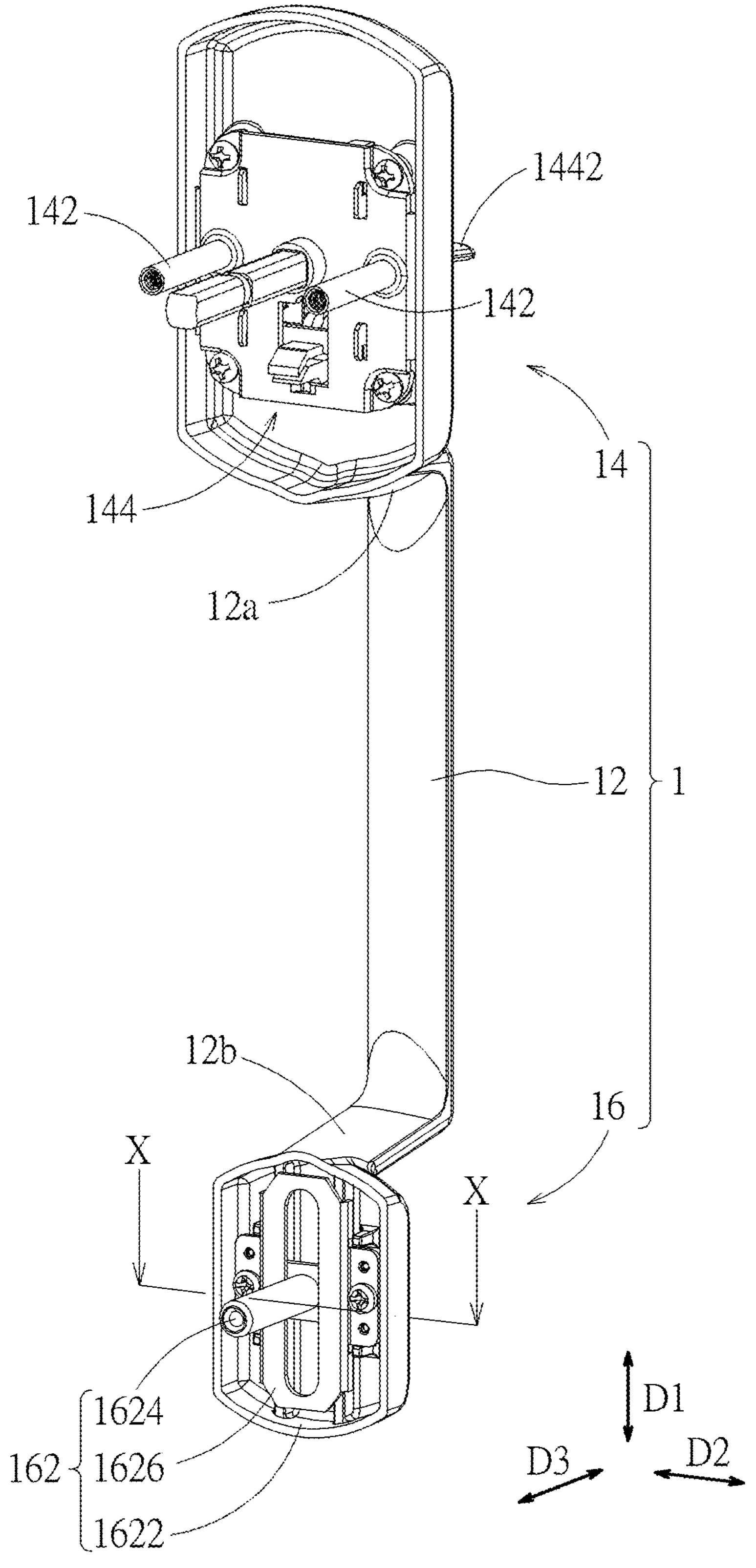
FIG. 1 is a schematic diagram illustrating a door lock handle according to an embodiment.

Please refer to FIG. 1. A door lock handle 1 according to an embodiment includes a grip portion 12, a first mount portion 14, and a second mount portion 16. The first mount portion 14 and a first end 12*a* of the grip portion 12 are fixedly connected. The second mount portion 16 and a second end 12*b* of the grip portion 12 are fixedly connected. The door lock handle 1 is fixed to a door panel (not shown in the figure) through the first mount portion 14 and the second mount portion 16, so that a user can hold the grip portion 12 to move the door panel. Therein, the first mount portion 14 is fixed onto the door panel through two mounting posts 142 (e.g., by screwing screws into the mounting posts 142 on the other side of the door panel). The first mount portion 14 also includes a latch drive assembly 144 for linking with a latch assembly disposed on the door panel. The latch drive assembly 144 includes a door lock actuator 1442 exposed on the first mount portion 14. The user can operate (e.g., press) the door lock actuator 1442 to drive a latch of the latch assembly through the latch drive assembly 144. The second mount portion 16 includes an adjustable door handle mounting structure 162 and is fixed to the door panel through the adjustable door handle mounting structure 162.

Figure 2:
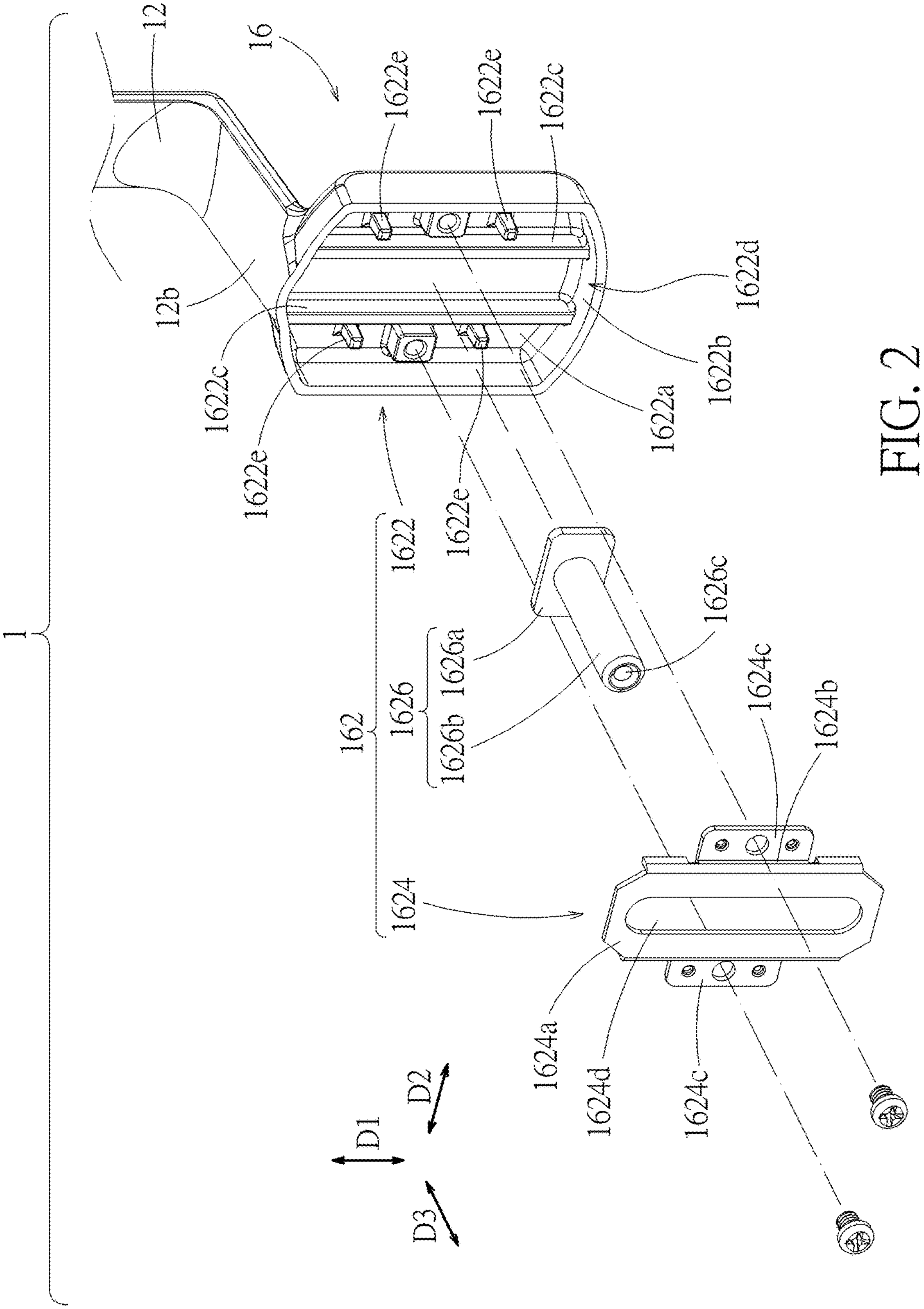
FIG. 2 is an exploded view of the door lock handle at its second mount portion in FIG. 1.
Figure 3:
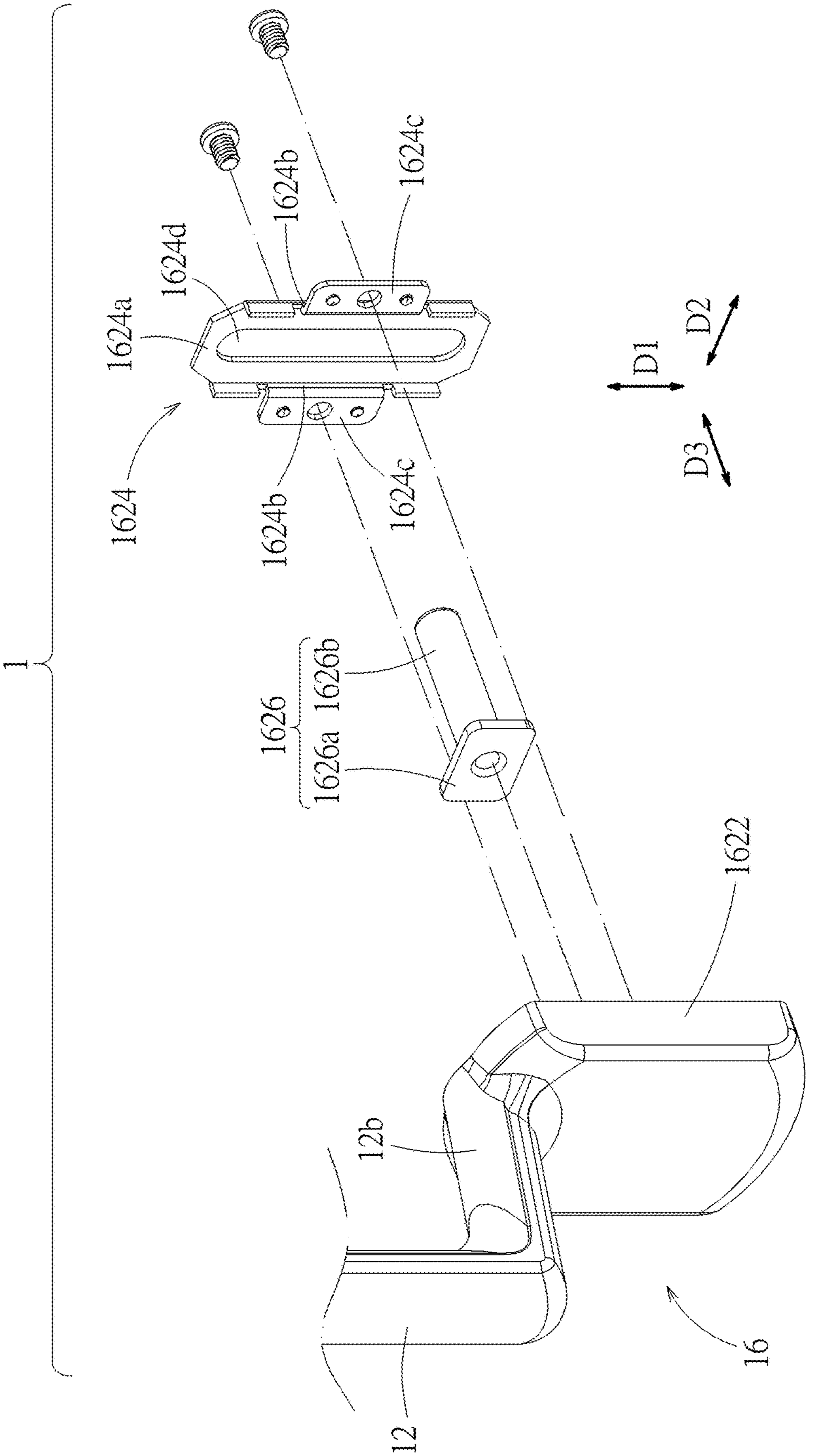
FIG. 3 is a schematic diagram of the door lock handle in FIG. 2 in another viewpoint.
Figure 4:
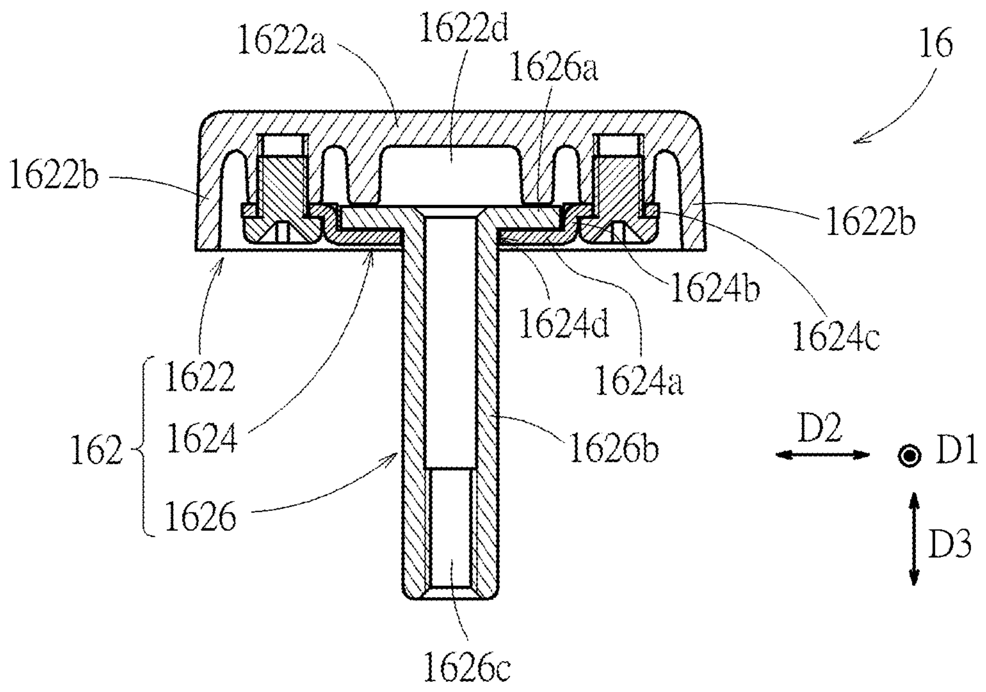
FIG. 4 is a sectional view of the second mount portion along the line X-X in FIG. 1.

Please also refer to FIG. 2 to FIG. 4. The adjustable door handle mounting structure 162 includes a handle mount portion 1622, a fixed plate 1624, and a movable mounting post 1626. The handle mount portion 1622 is fixedly connected to the second end 12*b* of the grip portion 12. The handle mount portion 1622 includes a bottom wall 1622*a*, a surrounding wall 1622*b*, and a plurality of ribs 1622*c* (in this embodiment, the number of the ribs 1622*c* is 2, but it is not limited thereto in practice). The surrounding wall 1622*b* surrounds the bottom wall 1622*a* and connects with the periphery of the bottom wall 1622*a*, so that the bottom wall 1622*a* and the surrounding wall 1622*b* jointly form an accommodating space 1622*d*. The ribs 1622*c* are disposed in the accommodating space 1622*d* and protrude from the bottom wall 1622*a*. Both ends of each rib 1622*c* are connected to the surrounding wall 1622*b*. The fixed plate 1624 includes a slot plate portion 1624*a*, two side wall portions 1624*b* bent and extended from opposite sides of the slot plate portion 1624*a* (in other words, the side wall portions 1624*b* extend perpendicular to the slot plate portion 1624*a*), and two fixing portions 1624*c* bent and extended from the two side wall portions 1624*b* (in other words, the fixing portions 1624*c* extend perpendicular to the side wall portions 1624*b*; in the embodiment, the fixing portions 1624*c* are parallel to the slot plate portion 1624*a*), respectively. A guiding slot 1624*d* is formed on the slot plate portion 1624*a*. The ribs 1622*c* and the guiding slot 1624*d* extend parallel to a first direction D1 (indicated by a double-headed arrow in the FIGURES). The fixed plate 1624 is fixed to the handle mount portion 1622 through the two fixing portions 1624*c*, so that the slot plate portion 1624*a* faces the ribs 1622*c* and the ribs 1622*c* are located between the two side wall portions 1624*b* in a second direction D2 (indicated by a double-headed arrow in the FIGURES). Therein, the first direction D1 is perpendicular to the second direction D2. The two side wall portions 1624*b* also extend parallel to the guiding slot 1624*d*.

The movable mounting post 1626 includes a movable plate 1626*a* and a post body 1626*b* fixed on the movable plate 1626*a*. The movable plate 1626*a* is movably disposed between the ribs 1622*c* and the slot plate portion 1624*a* of the fixed plate 1624 along the extending path of the guiding slot 1624*d* (in the embodiment, the guiding slot 1624*d* extends straight, and the extending path is a straight line). On the other hand, in structural logic, a sliding slot is formed between the plate edges of the ribs 1622*c* and the slot plate portion 1624*a*, and the movable plate 1626*a* is slidably disposed in the sliding slot. The post body 1626*b* extends from the movable plate 1626*a* parallel to a third direction D3 (indicated by a double-headed arrow in the FIGURES; it is perpendicular to the first direction D1 and the second direction D2) and passes through the guiding slot 1624*d*. The guiding slot 1624*d* limits the post body 1626*b* (together with the movable plate 1626*a*) to move along the extending path of the guiding slot 1624*d* (i.e., moving parallel to the first direction D1). The handle mount portion 1622 (or the second mount portion 16) is fixed onto the door panel through the movable mounting post 1626. Therein, the post body 1626*b* has an engagement structure 1626*c* (for example, but not limited to a threaded hole, so in practice, a screw can be screwed into the engagement structure 1626*c* on the other side of the door panel so as to fix the second mount portion 16 onto the door panel) at its free end.

Figure 5:
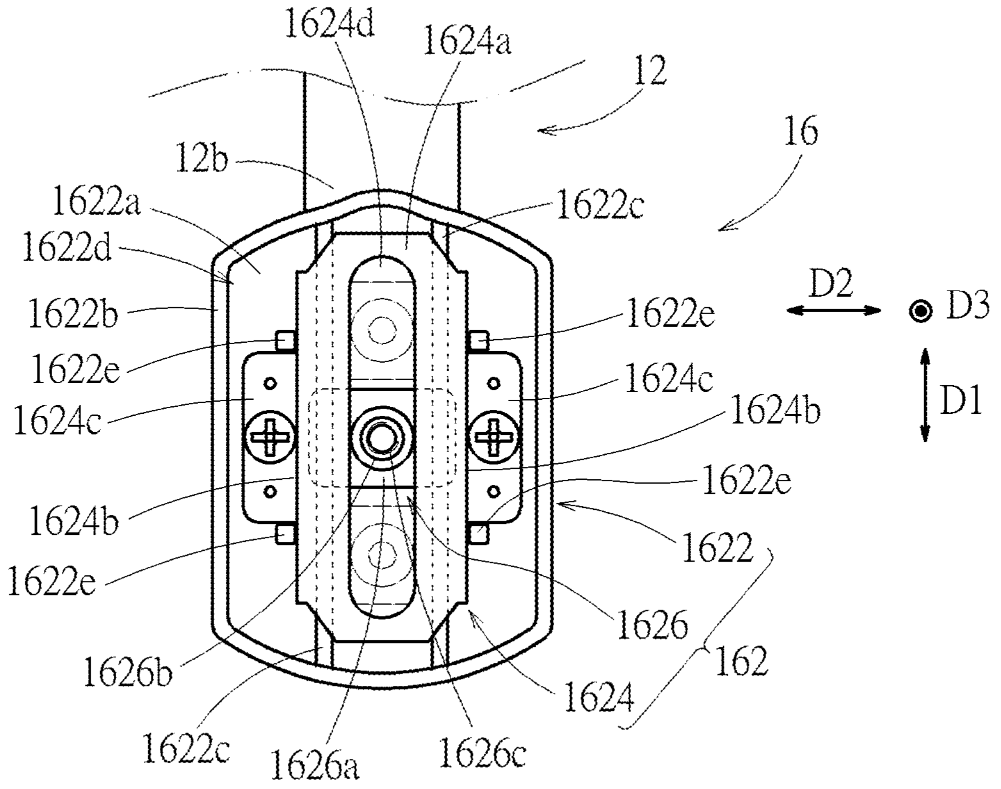
FIG. 5 is a schematic diagram illustrating the adjustment of a movable mounting post of the second mount portion.

Therefore, in practice, after the first mount portion 14 is initially fixed to the door panel, the user can adjust the relative position of the movable mounting post 1626 in the second mount portion 16 according to the actual mounting hole positions on the door panel (as shown in FIG. 5; therein, the hidden outline of the ribs 1622*c* and the hidden outline of the movable mounting post 1626 before adjustment are shown in dashed lines, and the adjusted movable mounting post 1626 is shown in chain lines), so that the post body 1626*b* can be smoothly inserted into the corresponding mounting hole, so as to complete the fixation of the second mount portion 16 on the door panel.

In addition, please refer to FIG. 2 to FIG. 4. In the embodiment, the other side surface of the movable plate 1626*a* away from the post body 1626*b* (i.e., the surface facing the ribs 1622*c*) may only contact the plate edges of the ribs 1622*c* (in the third direction D3). This structural feature helps to reduce the friction of the movable plate 1626*a* with the handle mount portion 1622 when the movable plate 1626*a* slides, which is conducive to smooth sliding of the movable plate 1626*a*. Moreover, the ribs 1622*c* are directly formed on the bottom wall 1622*a*, which can reduce the number of parts. In addition, the movable plate 1626*a* fits with the ribs 1622*c* and the slot plate portion 1624*a* with clearance, which facilitates the movement of the movable plate 1626*a* (e.g., reducing or avoiding the situation that the movable plate 1626*a* gets stuck when moving). Furthermore, in the embodiment, after the handle mount portion 1622 is fixed onto the door panel through the movable mounting post 1626, the surface of the movable plate 1626*a* facing the slot plate portion 1624*a* will tightly abut against the slot plate portion 1624*a* in principle. In addition, the bending and extending structural feature of the fixed plate 1624 helps to improve the structural strength of the fixed plate 1624, thereby helping the handle mount portion 1622 to be stably fixed to the door panel through the movable mounting post 1626. Furthermore, in the embodiment, the fixed plate 1624 is a single plate (e.g., formed by stamping a metal plate); however, it is not limited thereto in practice. For example, the fixed plate 1624 is implemented as an assembly.

Furthermore, in the embodiment, the post body 1626*b* and the ribs 1622*c* do not overlap in the third direction D3 (also referring to FIG. 5). In general, the structural rigidity of the movable mounting post 1626 mainly occurs at the post body 1626*b*, so the aforementioned structural configuration can avoid the situation that the movable plate 1626*a* of the movable mounting post 1626 rubs excessively with the ribs 1622*c* or the slot plate portion 1624*a* when sliding, resulting in complete jamming. Furthermore, in the embodiment, the ribs 1622*c* are located on opposite sides of the guiding slot 1624*d* relative to the guiding slot 1624*d* (or its extending path), and are structurally symmetrical relative to the guiding slot 1624*d*. This structural configuration helps to subject the movable mounting post 1626 to symmetrical (and identical) structural constraints, and also helps the movable plate 1626*a* to slide smoothly; however, it is not limited thereto in practice. In addition, in the embodiment, the handle mount portion 1622 includes two positioning posts 1622*e* for each fixing portion 1624*c*. The two positioning posts 1622*e* are located on opposite sides of the corresponding fixing portion 1624*c* in the first direction D1 (also referring to FIG. 5). This structural configuration helps to install the fixed plate 1624 to the handle mount portion 1622, and also helps the fixed plate 1624 to be stably fixed onto the handle mount portion 1622.

In addition, as shown by FIG. 1, in the embodiment, the first mount portion 14 and the second mount portion 16 are arranged parallel to the first direction D1 (i.e., the extending direction of the guiding slot 1624*d*). This structural configuration allows the adjustable door handle mounting structure 162 to be suitable for common cases where the mounting hole positions are misaligned (that is, the spacing between the mounting holes corresponding to the first mount portion 14 and the second mount portion 16 on the door panel in their arrangement direction involves a large deviation). Furthermore, as shown by FIG. 2 and FIG. 3, in the embodiment, the guiding slot 1624*d* extends in a straight line; however, it is not limited thereto in practice. For example, the guiding slot 1624*d* is modified to extend in an arc, which also has the adjustable effect.

As described above, the adjustable door handle mounting structure 162 makes the door lock handle 1 applicable to a larger range of mounting holes. For example, the mounting holes on the door panel are not accurately formed (e.g., the distance between the upper and lower mounting holes is too large or too small), but the door lock handle 1 can still be reliably installed on the door panel by adjusting the movable mounting post 1626. For another example, different door panels have mounting hole spacing corresponding to different door lock handles. A general door lock handle can only be installed on the corresponding door panel. However, the door lock handle 1 of this embodiment can still be adapted to different mounting hole spacing by adjusting the movable mounting post 1626, and thus can be installed on different door panels.

Furthermore, in the embodiment, the adjustable door handle mounting structure 162 is used in the door lock handle 1; however, it is not limited thereto in practice. For example, the adjustable door handle mounting structure 162 can also be applied to general door handles, which will not be described in addition.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An adjustable door handle mounting structure, comprising:

a handle mount portion, the handle mount portion having a plurality of ribs;

a fixed plate, the fixed plate having a guiding slot, the fixed plate being fixed to the handle mount portion facing the plurality of ribs, the plurality of ribs and the guiding slot extending in parallel; and a movable mounting post, the movable mounting post comprising a movable plate and a post body fixed on the movable plate, the post body having an engagement structure, the movable plate being movably disposed between the plurality of ribs and the fixed plate along an extending path of the guiding slot, the post body passing through the guiding slot, the guiding slot limiting the post body to move along the extending path of the guiding slot;

wherein the fixed plate comprises a slot plate portion and two side wall portions bent and extended from opposite sides of the slot plate portion, the guiding slot is formed on the slot plate portion, and the plurality of ribs are located between the two side wall portions.

2. The adjustable door handle mounting structure according to claim 1, wherein the post body extends parallel to a direction, and the post body and the plurality of ribs do not overlap in the direction.

3. The adjustable door handle mounting structure according to claim 1, wherein the plurality of ribs are located on opposite sides of the guiding slot relative to the extending path.

4. The adjustable door handle mounting structure according to claim 1, wherein the two side wall portions and the guiding slot extend in parallel.

5. The adjustable door handle mounting structure according to claim 1, wherein the fixed plate comprises two fixing portions bent and extended from the two side wall portions, respectively, and the fixed plate is fixed to the handle mount portion through the two fixing portions.

6. The adjustable door handle mounting structure according to claim 5, wherein the handle mount portion comprises two positioning posts corresponding to each fixing portion, and the two positioning posts are located on opposite sides of the corresponding fixing portion.

7. The adjustable door handle mounting structure according to claim 1, wherein the handle mount portion comprises a bottom wall and a surrounding wall, the surrounding wall surrounds the bottom wall and is connected to a periphery of the bottom wall, the rib protrudes from the bottom wall, and both ends of the rib are connected to the surrounding wall.

8. The adjustable door handle mounting structure according to claim 1, wherein the fixed plate is a single plate.

9. A door lock handle, comprising:

a grip portion;

a first mount portion, the first mount portion and a first end of the grip portion being fixedly connected, the first mount portion having a door lock actuator, the door lock actuator being exposed; and a second mount portion, the second mount portion and a second end of the grip portion being fixedly connected, the second mount portion comprising an adjustable door handle mounting structure, the adjustable door handle mounting structure comprising:

a handle mount portion, the handle mount portion being fixedly connected to the second end and having a plurality of ribs;

a fixed plate, the fixed plate having a guiding slot, the fixed plate being fixed to the handle mount portion facing the plurality of ribs, the plurality of ribs and the guiding slot extending in parallel; and a movable mounting post, the movable mounting post comprising a movable plate and a post body fixed on the movable plate, the post body having an engagement structure, the movable plate being movably disposed between the plurality of ribs and the fixed plate along an extending path of the guiding slot, the post body passing through the guiding slot, the guiding slot limiting the post body to move along the extending path of the guiding slot;

wherein the fixed plate comprises a slot plate portion and two side wall portions bent and extended from opposite sides of the slot plate portion, the guiding slot is formed on the slot plate portion, and the plurality of ribs are located between the two side wall portions.

10. The door lock handle according to claim 9, wherein the guiding slot extends parallel to a direction, and the first mount portion and the second mount portion are arranged parallel to the direction.

11. The door lock handle according to claim 9, wherein the post body extends parallel to a direction, and the post body and the plurality of ribs do not overlap in the direction.

12. The door lock handle according to claim 9, wherein the plurality of ribs are located on opposite sides of the guiding slot relative to the extending path.

13. The door lock handle according to claim 9, wherein the two side wall portions and the guiding slot extend in parallel.

14. The door lock handle according to claim 9, wherein the fixed plate comprises two fixing portions bent and extended from the two side wall portions, respectively, and the fixed plate is fixed to the handle mount portion through the two fixing portions.

15. The door lock handle according to claim 14, wherein the handle mount portion comprises two positioning posts corresponding to each fixing portion, and the two positioning posts are located on opposite sides of the corresponding fixing portion.

16. The door lock handle according to claim 9, wherein the handle mount portion comprises a bottom wall and a surrounding wall, the surrounding wall surrounds the bottom wall and is connected to a periphery of the bottom wall, the rib protrudes from the bottom wall, and both ends of the rib are connected to the surrounding wall.

17. The door lock handle according to claim 9, wherein the fixed plate is a single plate.

* * * * *